US011306601B2

United States Patent
Husband et al.

(10) Patent No.: US 11,306,601 B2
(45) Date of Patent: Apr. 19, 2022

(54) PINNED AIRFOIL FOR GAS TURBINE ENGINES

(71) Applicant: United Technologies Corporation, Farmington, CT (US)

(72) Inventors: Jason Husband, South Glastonbury, CT (US); James Glaspey, Farmington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 640 days.

(21) Appl. No.: 16/163,610

(22) Filed: Oct. 18, 2018

(65) Prior Publication Data

US 2020/0123915 A1     Apr. 23, 2020

(51) Int. Cl.
*F01D 5/30*     (2006.01)
*F01D 5/14*     (2006.01)
*F01D 5/28*     (2006.01)

(52) U.S. Cl.
CPC ........... *F01D 5/3046* (2013.01); *F01D 5/147* (2013.01); *F01D 5/282* (2013.01); *F01D 5/3053* (2013.01);
(Continued)

(58) Field of Classification Search
CPC .......... F01D 5/30; F01D 5/3023; F01D 5/303; F01D 5/3038; F01D 5/3046;
(Continued)

(56) References Cited

U.S. PATENT DOCUMENTS

| | | | |
|---|---|---|---|
| 1,289,278 A | * | 12/1918 | Schmidt ................ F01D 5/3053 416/217 |
| 1,936,894 A | * | 11/1933 | Whiteley ................ F16C 33/24 384/286 |

(Continued)

FOREIGN PATENT DOCUMENTS

| | | |
|---|---|---|
| EP | 1182329 | 2/2002 |
| EP | 2362066 | 8/2011 |

(Continued)

OTHER PUBLICATIONS

Partial European Search Report for European Patent Application No. 19203572.3 completed May 28, 2020.

(Continued)

*Primary Examiner* — David E Sosnowski
*Assistant Examiner* — Wayne A Lambert
(74) *Attorney, Agent, or Firm* — Carlson, Gaskey & Olds, P.C.

(57) ABSTRACT

An airfoil for a gas turbine engine according to an example of the present disclosure includes, among other things, an airfoil section that extends from a root section. The airfoil section extends between a leading edge and a trailing edge in a chordwise direction and extends between a tip portion and the root section in a radial direction, and the airfoil section defines a pressure side and a suction side separated in a thickness direction. The airfoil section includes a metallic sheath that receives a composite core, and the core includes first and second ligaments received in respective internal channels defined by the sheath such that the first and second ligaments are spaced apart along the root section with respect to the chordwise direction. The first and second ligaments define respective sets of bores, and the respective sets of bores are aligned to receive a common set of retention pins.

9 Claims, 14 Drawing Sheets

(52) U.S. Cl.
CPC ...... *F05D 2240/30* (2013.01); *F05D 2260/30* (2013.01); *F05D 2300/603* (2013.01)

(58) Field of Classification Search
CPC ...... F01D 5/3053; F01D 5/3092; F01D 25/18; F01D 5/147; F01D 5/282; F01D 5/18; F01D 5/16; F01D 5/225; F01D 5/26; F01D 11/008; F04D 29/322; F04D 29/325; F04D 29/329; F04D 29/34; F05D 2240/30; F05D 2260/30; F05D 2260/98; F05D 2300/603; F05D 2300/6034; F05D 2220/36; F05D 2250/314; F16B 2001/0021; F16D 1/076; Y02T 50/60
See application file for complete search history.

(56) References Cited

U.S. PATENT DOCUMENTS

| | | | | |
|---|---|---|---|---|
| 2,067,034 A * | 1/1937 | Whiteley | ............ | F16C 33/103 384/292 |
| 2,635,848 A | 4/1953 | McDowell | | |
| 2,790,620 A | 4/1957 | Rankin | | |
| 2,872,156 A * | 2/1959 | Brown | ............... | F01D 5/3053 415/209.4 |
| 2,916,808 A | 12/1959 | Wilkes | | |
| 2,969,952 A * | 1/1961 | Stalker | ............... | F01D 5/30 416/140 |
| 3,043,563 A * | 7/1962 | Gray | ............... | F01D 5/3053 416/217 |
| 3,297,302 A * | 1/1967 | Spears, Jr. | ............ | F01D 5/027 416/144 |
| 3,404,831 A * | 10/1968 | Campbell | ........... | F01D 5/022 415/9 |
| 3,694,104 A | 9/1972 | Erwin | | |
| 3,860,361 A * | 1/1975 | McMurtry | .......... | F01D 5/3023 416/120 |
| 4,135,849 A * | 1/1979 | Pigott | ............... | F01D 5/3053 415/119 |
| 4,279,572 A * | 7/1981 | Auriemma | ........... | F01D 5/323 416/220 R |
| 4,321,012 A * | 3/1982 | Tan | ............... | F01D 5/3053 416/217 |
| 4,505,640 A * | 3/1985 | Hsing | ............... | F01D 5/187 416/219 R |
| 4,643,647 A | 2/1987 | Perry | | |
| 4,809,420 A * | 3/1989 | Landy | ............... | B23P 9/025 29/281.1 |
| 4,961,687 A | 10/1990 | Bost et al. | | |
| 4,966,527 A | 10/1990 | Merz | | |
| 5,017,092 A * | 5/1991 | Violette | ............ | B64C 11/06 416/204 A |
| 5,022,824 A | 6/1991 | Violette et al. | | |
| 5,062,769 A * | 11/1991 | Ortolano | ............. | F01D 5/3053 416/217 |
| 5,074,753 A | 12/1991 | Covington et al. | | |
| 5,102,300 A | 4/1992 | Violette et al. | | |
| 5,129,786 A | 7/1992 | Gustafson | | |
| 5,129,787 A | 7/1992 | Violette et al. | | |
| 5,141,400 A | 8/1992 | Murphy et al. | | |
| 5,163,817 A | 11/1992 | Violette et al. | | |
| 5,205,714 A | 4/1993 | Shah et al. | | |
| 5,240,377 A | 8/1993 | Farr | | |
| 5,281,096 A | 1/1994 | Harris et al. | | |
| 5,322,372 A * | 6/1994 | You | ............... | F16C 33/14 384/285 |
| 5,409,353 A | 4/1995 | Imbault | | |
| 5,464,326 A | 11/1995 | Knott | | |
| 5,562,348 A * | 10/1996 | Link | ............... | F16C 19/54 384/474 |
| 5,791,879 A | 8/1998 | Fitzgerald et al. | | |
| 5,839,882 A | 11/1998 | Finn et al. | | |
| 6,039,542 A | 3/2000 | Schilling et al. | | |
| 6,109,877 A | 8/2000 | Gekht et al. | | |
| 6,213,719 B1 | 4/2001 | Violette | | |
| 6,217,283 B1 | 4/2001 | Ravenhall et al. | | |
| 6,261,058 B1 | 7/2001 | Kataoka et al. | | |
| 6,305,905 B1 | 10/2001 | Nagle et al. | | |
| 6,364,613 B1 * | 4/2002 | Deallenbach | ......... | F01D 5/3053 416/220 R |
| 6,422,820 B1 | 7/2002 | Anderson | | |
| 6,431,837 B1 | 8/2002 | Velicki | | |
| 6,872,340 B2 | 3/2005 | Cundiff et al. | | |
| 7,320,549 B2 * | 1/2008 | Kubota | ............... | F16C 17/02 384/283 |
| 7,476,084 B1 | 1/2009 | Chan et al. | | |
| 7,503,750 B1 | 3/2009 | Violette | | |
| 7,828,526 B2 | 11/2010 | Cairo et al. | | |
| 8,241,003 B2 | 8/2012 | Roberge | | |
| 8,272,841 B2 | 9/2012 | Pentony | | |
| 8,496,443 B2 | 7/2013 | Campbell et al. | | |
| 8,500,410 B2 | 8/2013 | De Moura et al. | | |
| 8,834,125 B2 | 9/2014 | Alvanos | | |
| 8,973,551 B2 * | 3/2015 | Zhu | .................... | F16C 33/1065 123/197.3 |
| 9,126,681 B1 | 9/2015 | Judge | | |
| 9,145,784 B2 | 9/2015 | Evans et al. | | |
| 9,297,268 B2 | 3/2016 | Alarcon | | |
| 9,366,155 B2 | 6/2016 | Tutaj et al. | | |
| 9,835,053 B2 * | 12/2017 | Do | ......... | F01D 25/16 |
| 9,840,921 B2 | 12/2017 | Petallaz et al. | | |
| 9,958,113 B2 | 5/2018 | Palmer | | |
| 10,018,055 B2 | 7/2018 | Robertson | | |
| 10,371,165 B2 | 8/2019 | Weisse et al. | | |
| 10,507,518 B2 | 12/2019 | Merrill et al. | | |
| 2006/0292398 A1 * | 12/2006 | Vigneau | ............. | C10M 103/02 428/698 |
| 2008/0181766 A1 | 7/2008 | Campbell et al. | | |
| 2008/0232969 A1 | 9/2008 | Brault | | |
| 2009/0047132 A1 | 2/2009 | Riley et al. | | |
| 2009/0285686 A1 | 11/2009 | Violette | | |
| 2013/0039774 A1 | 2/2013 | Viens et al. | | |
| 2013/0064676 A1 | 3/2013 | Salisbury et al. | | |
| 2013/0167555 A1 | 7/2013 | Schwarz et al. | | |
| 2015/0117804 A1 * | 4/2015 | Alarcon | ............. | F01D 5/3053 384/296 |
| 2015/0125305 A1 | 5/2015 | Duelm | | |
| 2016/0146021 A1 | 5/2016 | Freeman et al. | | |
| 2016/0356178 A1 * | 12/2016 | Do | ............... | F01D 25/16 |
| 2017/0254207 A1 | 9/2017 | Schetzel et al. | | |
| 2018/0112545 A1 | 4/2018 | De Gaillard et al. | | |
| 2018/0119707 A1 | 5/2018 | Murdock | | |
| 2019/0284938 A1 | 9/2019 | Senile et al. | | |

FOREIGN PATENT DOCUMENTS

| | | | | |
|---|---|---|---|---|
| EP | 2458153 | | 5/2012 | |
| EP | 3020926 | | 5/2016 | |
| FR | 2654773 A1 * | | 5/1991 | ........... F01D 5/3053 |
| GB | 800839 A * | | 9/1958 | ........... F01D 5/3053 |
| GB | 897415 A * | | 5/1962 | ............... F01D 5/30 |
| GB | 2234035 A * | | 1/1991 | ......... F16H 57/0482 |

OTHER PUBLICATIONS

International Search Report and Written Opinion for PCT Application No. PCT/US2014/050614 completed Nov. 19, 2014.
International Preliminary Report on Patentability for PCT Application No. PCT/US2014/050614 completed Mar. 15, 2016.
Extended European Search Report for European Patent Application No. 14842050.8 completed May 9, 2017.
United States Statutory Registration No. H1258. Blade Lock Screw. Published Dec. 7, 1993 to Hindle, Jr.

* cited by examiner

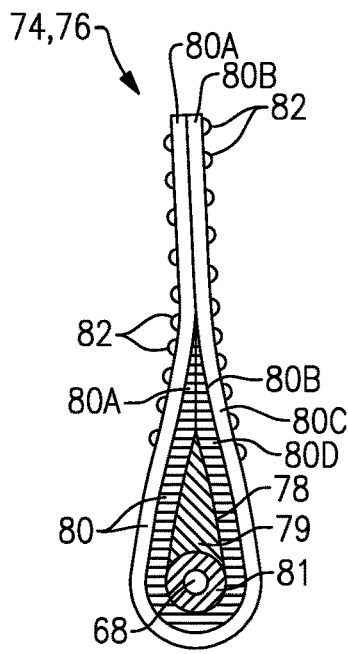
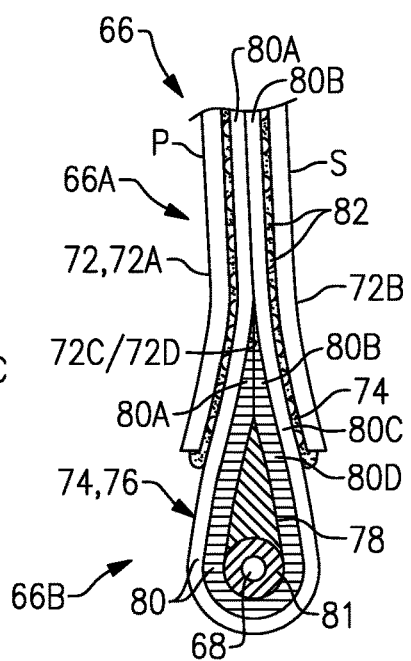
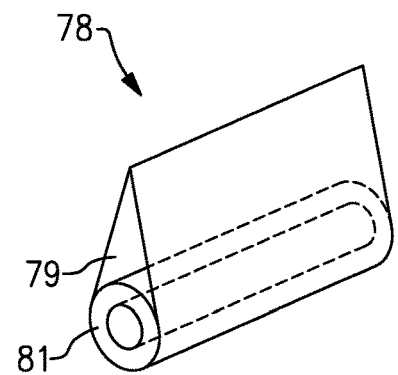
FIG.9  FIG.10  FIG.11
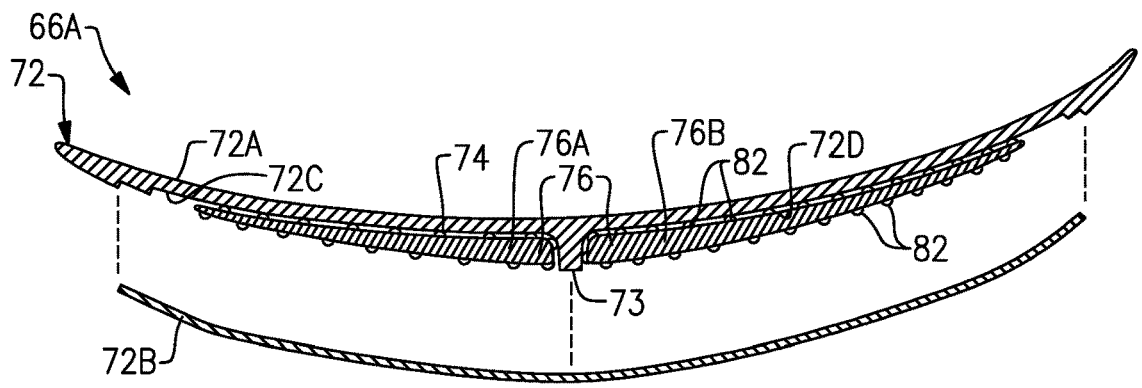
FIG.12
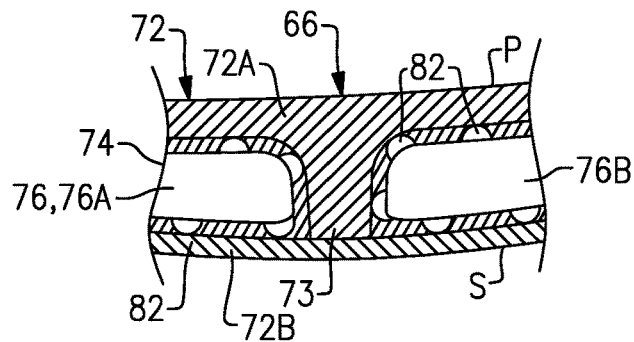
FIG.13

PINNED AIRFOIL FOR GAS TURBINE ENGINES

BACKGROUND

This disclosure relates to a gas turbine engine, and more particularly to a rotor assembly including airfoils retained by a pinned architecture.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion. The fan typically includes an array of fan blades having dovetails that are mounted in slots of a fan hub.

SUMMARY

An airfoil for a gas turbine engine according to an example of the present disclosure includes an airfoil section that extends from a root section. The airfoil section extends between a leading edge and a trailing edge in a chordwise direction and extends between a tip portion and the root section in a radial direction, and the airfoil section defines a pressure side and a suction side separated in a thickness direction. The airfoil section includes a metallic sheath that receives a composite core, and the core includes first and second ligaments received in respective internal channels defined by the sheath such that the first and second ligaments are spaced apart along the root section with respect to the chordwise direction. The first and second ligaments define respective sets of bores, and the respective sets of bores are aligned to receive a common set of retention pins.

In a further embodiment of any of the foregoing embodiments, each one of the ligaments defines a slot in the root section to define a first root portion and a second root portion, and the slot dimensioned to receive an annular flange of a hub.

In a further embodiment of any of the foregoing embodiments, each one of the ligaments includes at least one interface portion in the root section, and each one of the ligaments includes at least one composite layer that loops around the at least one interface portion such that opposed end portions of the at least one composite layer are joined together along the airfoil section.

In a further embodiment of any of the foregoing embodiments, the at least one interface portion includes a mandrel tapering from first and second bushings, and the first and second bushings define one of the sets of bores.

In a further embodiment of any of the foregoing embodiments, the at least one composite layer includes a first layer and a second layer. The first layer is between the second layer and one of the internal channels. The first layer defines a first fiber construction that includes at least one ply of unidirectional fibers, and the second layer defines a second fiber construction that differs from the first fiber construction and includes at least one ply of a three dimensional weave of fibers.

In a further embodiment of any of the foregoing embodiments, each one of the ligaments defines a slot defined in the root section to define a first root portion and a second root portion. The slot is dimensioned to receive an annular flange.

In a further embodiment of any of the foregoing embodiments, the at least one interface portion includes a first interface portion in the first root portion and a second interface portion in the second root portion, and the first and second root portions are on opposed sides of the annular flange when in an installed position.

A rotor assembly for a gas turbine engine according to an example of the present disclosure includes an airfoil that has an airfoil section extending from a root section. The airfoil section extends between a leading edge and a trailing edge in a chordwise direction and extends between a tip portion and the root section in a radial direction, and the airfoil section defines a pressure side and a suction side separated in a thickness direction. At least one retention pin extends through the root section to mechanically attaches the root section to an array of annular flanges of a rotatable hub, and the at least one retention pin defines an internal lubrication circuit that has branched paths having outlets aligned with the flanges.

In a further embodiment of any of the foregoing embodiments, the airfoil section includes a metallic sheath that receives a composite core, and the core includes a plurality of ligaments received in respective internal channels defined by the sheath.

In a further embodiment of any of the foregoing embodiments, each one of the ligaments includes at least one interface portion in the root section, and each one of the ligaments includes at least one composite layer that loops around the at least one interface portion such that opposed end portions of the at least one composite layer are joined together along the airfoil section. The at least one interface portion includes a mandrel tapering from a bushing that slideably receives the at least one retention pin.

In a further embodiment of any of the foregoing embodiments, the root portion includes a plurality of bushings that receive the at least one retention pin, and the branched paths have outlets aligned with the bushings.

In a further embodiment of any of the foregoing embodiments, each of the flanges define a bore for receiving the at least one retention pin, and further includes an elongated sleeve slideably received along a length of the at least one retention pin such that the at least one retention pin is spaced apart from surfaces of the bushings and surfaces of the bore of each of the flanges.

In a further embodiment of any of the foregoing embodiments, the at least one retention pin includes first and second retention pins that each extend through the root section and through each of the flanges to mechanically attach the root section to the hub.

A rotor assembly for a gas turbine engine according to an example of the present disclosure includes a rotatable hub that has a main body that extends along a longitudinal axis, and has an array of annular flanges that extends about an outer periphery of the main body to define an array of annular channels along the longitudinal axis. An array of airfoils are circumferentially distributed about the outer periphery. Each one of the airfoils has an airfoil section that extends from a root section received in the annular channels. The airfoil section includes a metallic sheath and a composite core. The core has first and second ligaments at least partially received in respective internal channels defined in the sheath. A plurality of retention pins are arranged in sets, and each of the sets includes first and second retention pins each that extend through the root section of a respective one of the airfoils, across each of the annular channels and through each of the annular flanges to mechanically attach the root section to the hub such that the first and second pins are at least partially axially aligned with respect to the longitudinal axis.

A further embodiment of any of the foregoing embodiments includes an array of platforms that abut against respective pairs of the airfoils radially outward of the retention pins. The annular flanges include at least three annular flanges axially spaced apart relative to the longitudinal axis.

In a further embodiment of any of the foregoing embodiments, the first retention pin differs in construction from the second retention pin such that yielding of the first retention pin occurs prior to yielding of the second retention pin in response to a load on the airfoil section.

In a further embodiment of any of the foregoing embodiments, the first retention pin defines a first cross-sectional geometry, and the second retention pin defines a second cross-sectional geometry that differs from the first cross-sectional geometry.

In a further embodiment of any of the foregoing embodiments, each one of the ligaments defines a reference plane that extends through the airfoil section to circumferentially divide the root portion such that the first retention pin is aligned with the reference plane and the second retention pin is offset from the reference plane.

In a further embodiment of any of the foregoing embodiments, the first retention pin differs in construction from the second retention pin.

In a further embodiment of any of the foregoing embodiments, the root portion includes a plurality of bushings that receive the first and second retention pins.

In a further embodiment of any of the foregoing embodiments, each of the first and second retention pins defines an internal lubrication circuit including branched paths having outlets aligned with the flanges and the bushings.

In a further embodiment of any of the foregoing embodiments, each of the flanges defines a plurality of bores for receiving the first and second retention pins, and further comprising first and second elongated sleeves slideably received along a length of the first and second retention pins such that the first and second retention pins are spaced apart from surfaces of the bushings and surfaces of the bores of each of the flanges.

In a further embodiment of any of the foregoing embodiments, at least one of the first and second retention pins defines a pin axis that is skewed relative to the longitudinal axis when in an installed position.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 9 illustrates a sectional view of a composite core.

FIG. 10 illustrates a sectional view of the composite core of FIG. 9 secured to a sheath.

FIG. 11 illustrates an interface portion of the composite core of FIG. 9.

FIG. 12 illustrates the composite core arranged relative to skins of the sheath of FIG. 10.

FIG. 13 illustrates a sectional view of the airfoil of FIG. 10.

DETAILED DESCRIPTION

Figure 1:
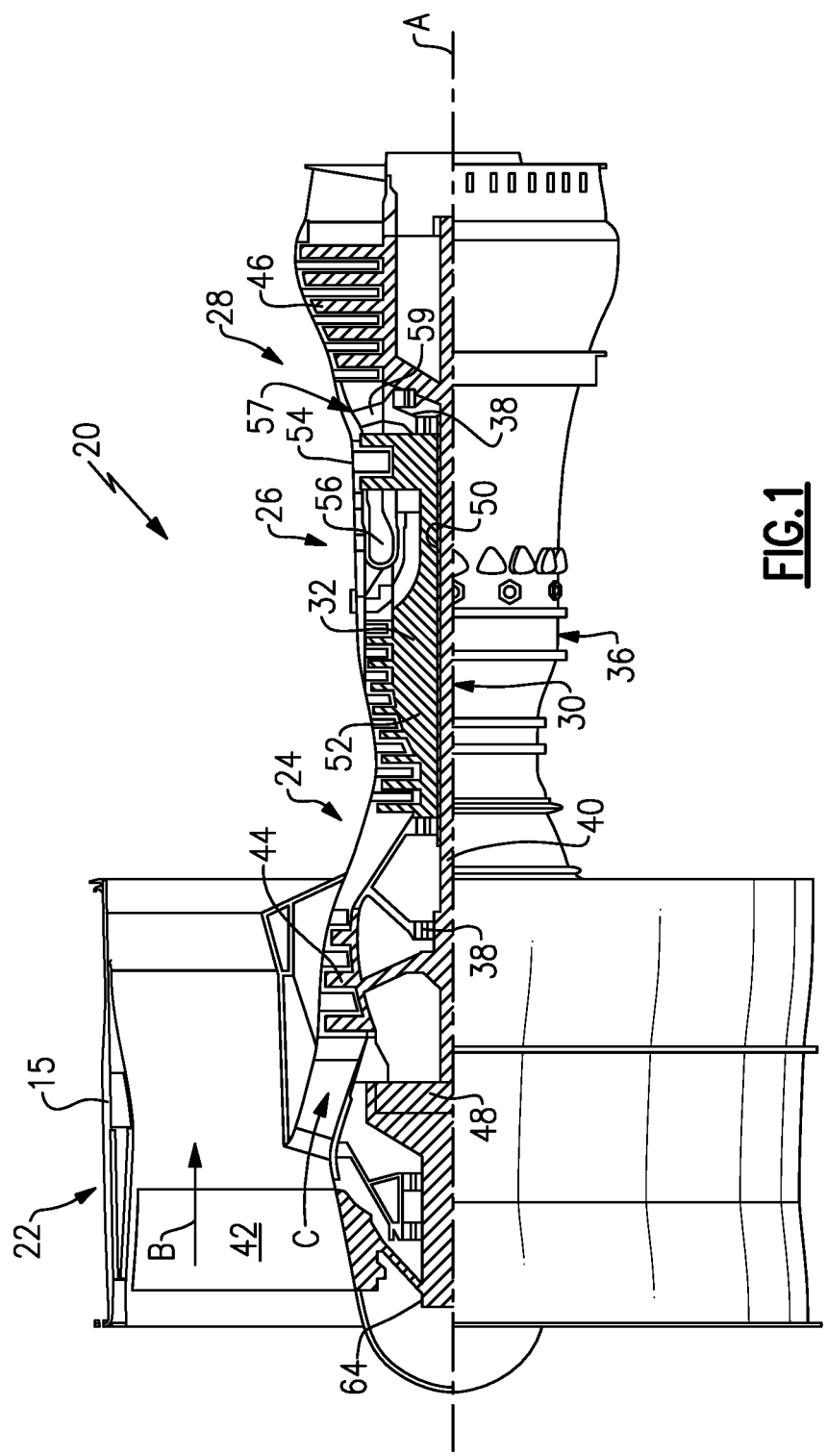
FIG. 1 illustrates an example turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
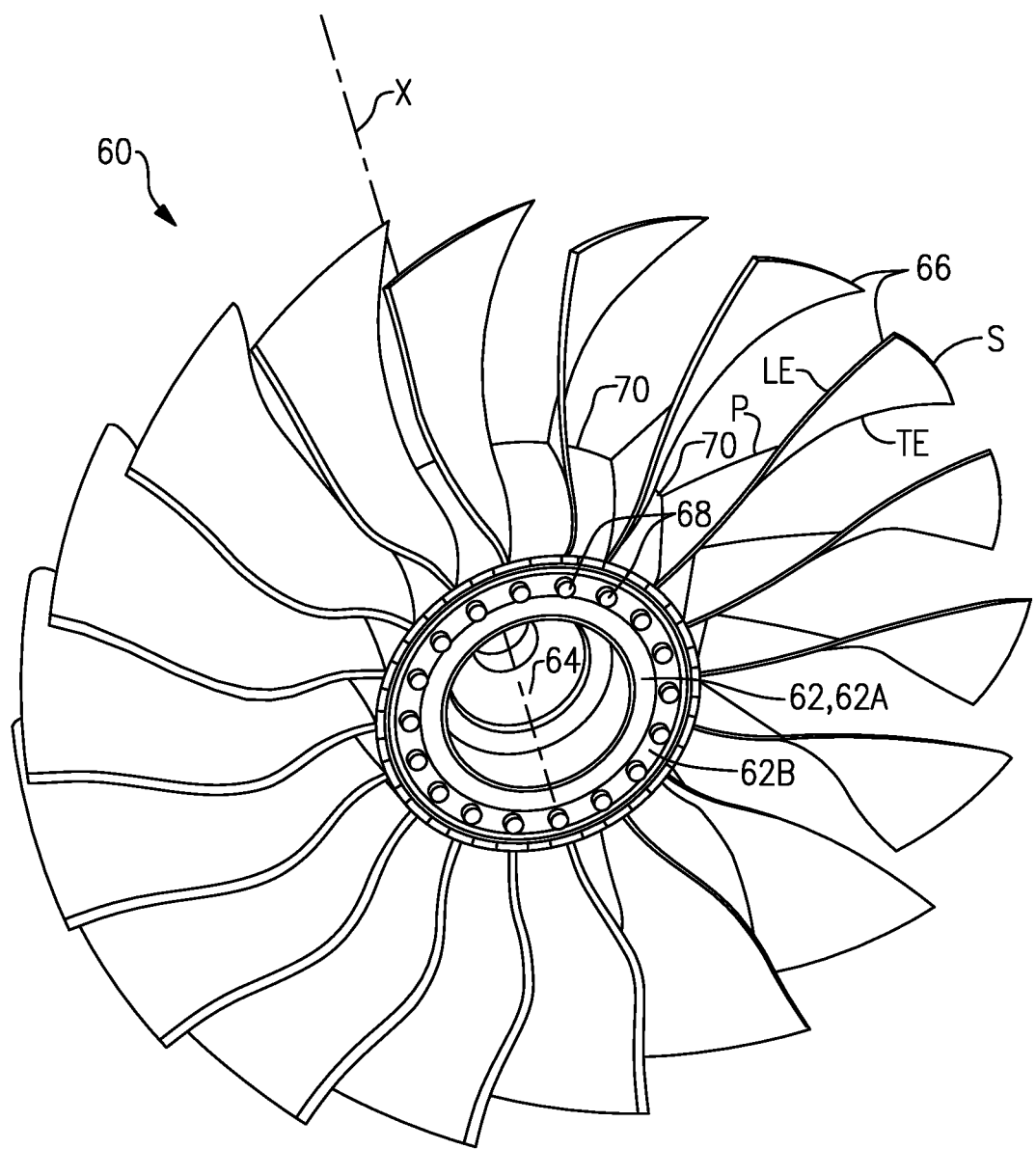
FIG. 2 illustrates a perspective view of an example rotor assembly including an array of airfoils.

FIG. 2 illustrates a rotor assembly 60 for a gas turbine engine according to an example. The rotor assembly 60 can be incorporated into the fan section 12 or the compressor section 24 of the engine 20 of FIG. 1, for example. However, it should be understood that other parts of the gas turbine engine 20 and other systems may benefit from the teachings disclosed herein. In some examples, the rotor assembly 60 is incorporated into a multi-stage fan section of a direct drive or geared engine architecture.

Figure 3:
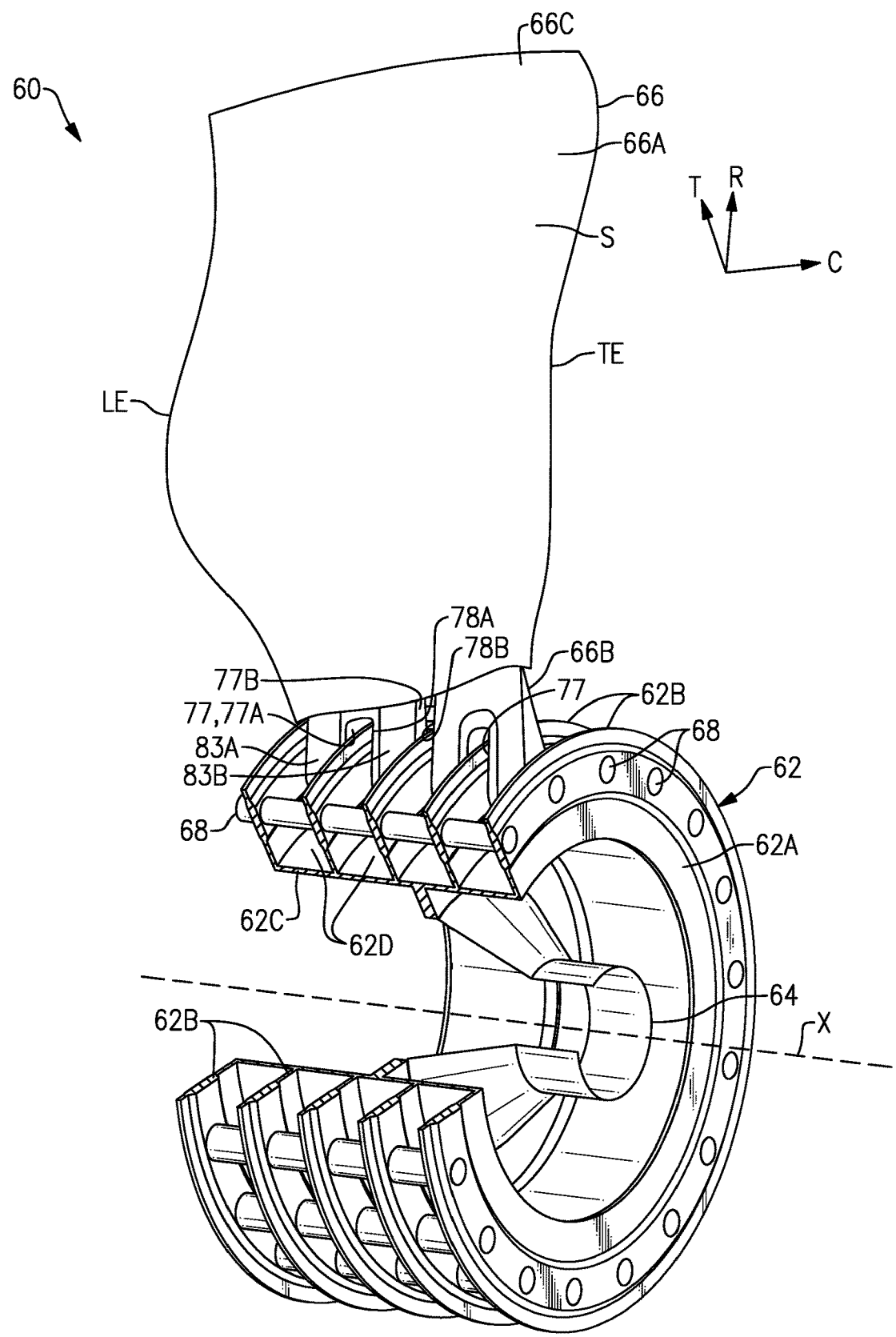
FIG. 3 illustrates a perspective view of one of the airfoils of FIG. 2 secured to a hub.

The rotor assembly 60 includes a rotatable hub 62 mechanically attached or otherwise mounted to a fan shaft 64. The fan shaft 64 is rotatable about longitudinal axis X. The fan shaft 64 can be rotatably coupled to the low pressure turbine 46 (FIG. 1), for example. The rotatable hub 62 includes a main body 62A that extends along the longitudinal axis X. The longitudinal axis X can be parallel to or collinearly with the engine longitudinal axis A of FIG. 1, for example. As illustrated by FIG. 3, the hub 62 includes an array of annular flanges 62B that extend about an outer periphery 62C of the main body 62A. The annular flanges 62B define an array of annular channels 62D along the longitudinal axis X.

An array of airfoils 66 are circumferentially distributed about the outer periphery 62C of the rotatable hub 62. Referring to FIG. 3, with continued reference to FIG. 2, one of the airfoils 66 mounted to the hub 62 is shown for illustrative purposes. The airfoil 66 includes an airfoil section 66A extending from a root section 66B. The airfoil section 66A extends between a leading edge LE and a trailing edge TE in a chordwise direction C, and extends in a radial direction R between the root section 66B and a tip portion 66C to provide an aerodynamic surface. The tip portion 66C defines a terminal end or radially outermost extent of the airfoil 66 to establish a clearance gap with fan case 15 (FIG. 1). The airfoil section 66A defines a pressure side P (FIG. 2) and a suction side S separated in a thickness direction T. The root section 66B is dimensioned to be received in each of the annular channels 62D.

Figure 4:
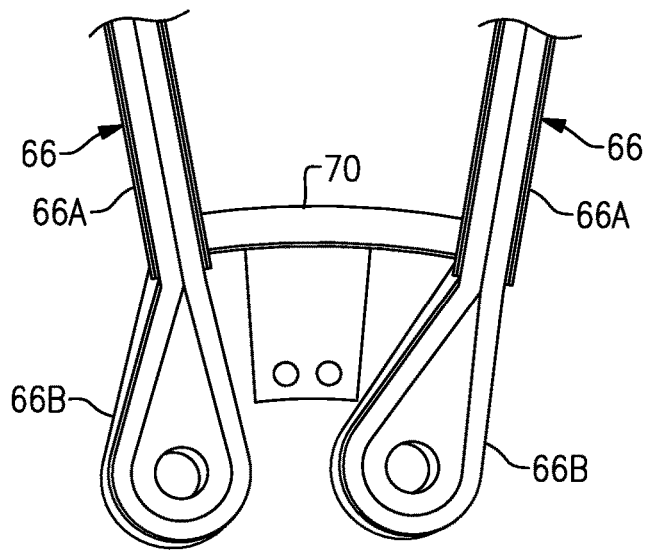
FIG. 4 illustrates adjacent airfoils of the rotor assembly of FIG. 2.

The rotor assembly 60 includes an array of platforms 70 that are separate and distinct from the airfoils 66. The platforms 70 are situated between and abut against adjacent pairs of airfoils 66 to define an inner boundary of a gas path along the rotor assembly 60, as illustrated in FIG. 2. The platforms 70 can be mechanically attached and releasably secured to the hub 62 with one or more fasteners, for example. FIG. 4 illustrates one of the platforms 70 abutting against the airfoil section 66A of adjacent airfoils 66.

Figure 5A:
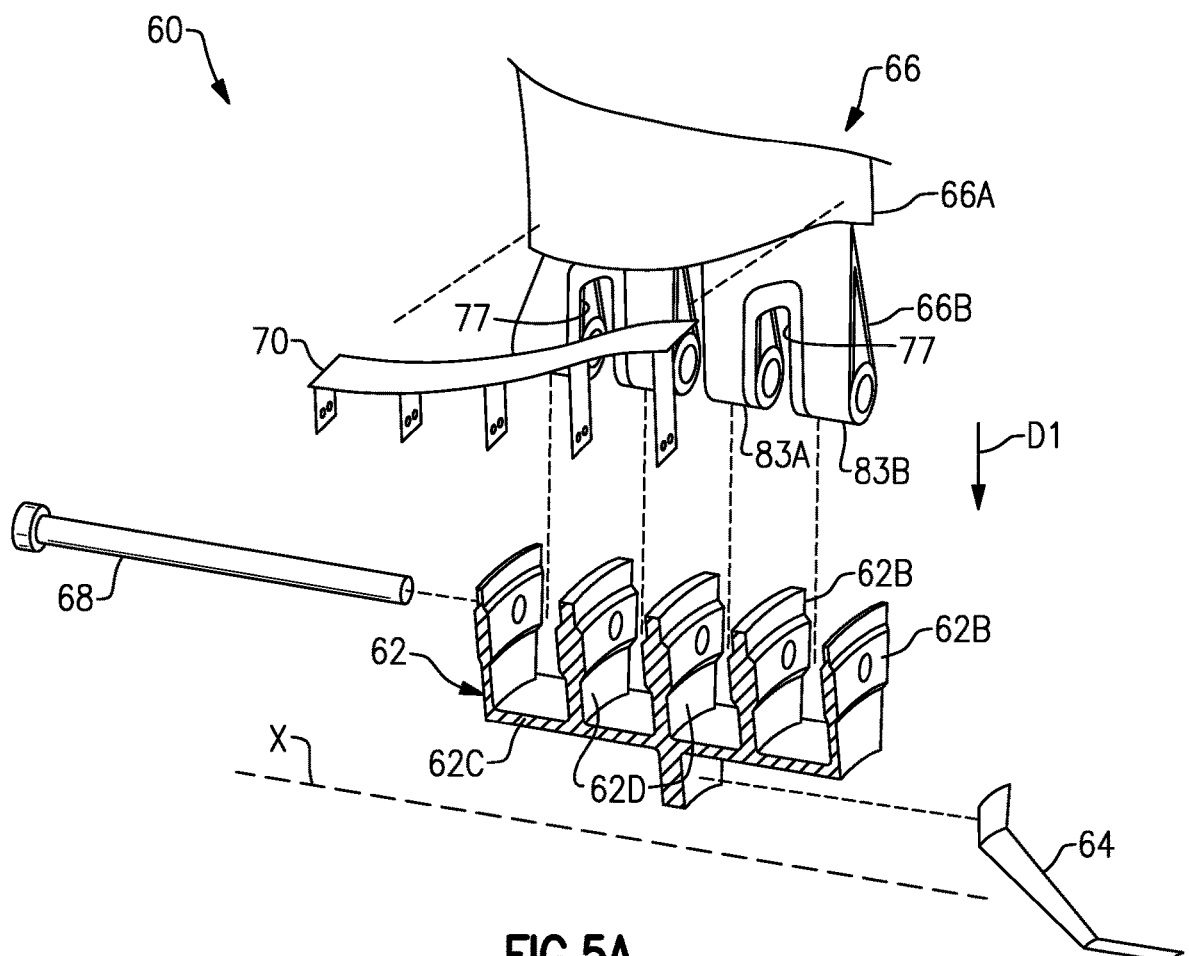
FIG. 5A illustrates an exploded view of portions of the rotor assembly of FIG. 2.
Figure 5B:
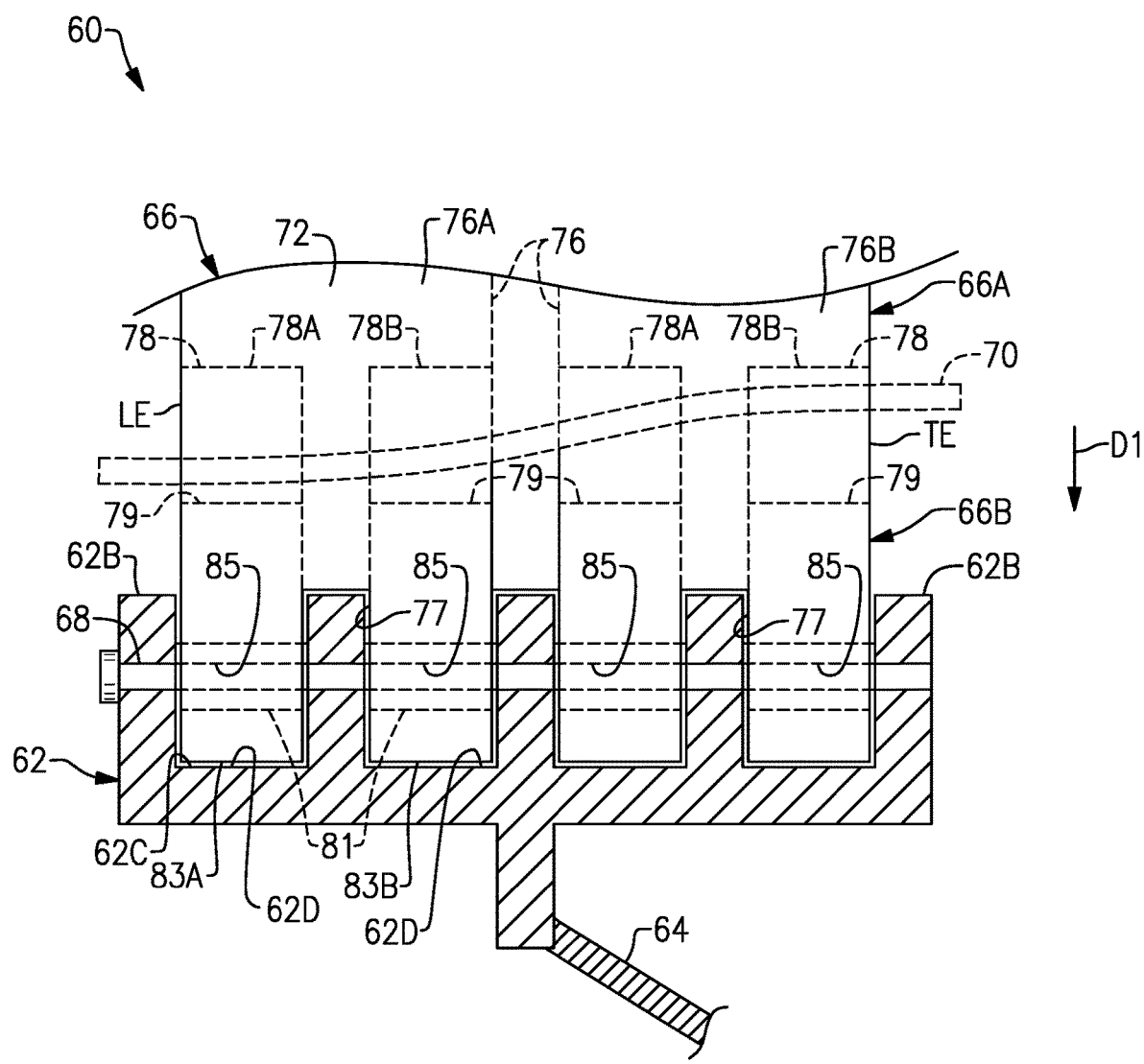
FIG. 5B illustrates a side view of the rotor assembly of FIG. 2 with the hub illustrated in cross-section.

FIG. 5A illustrates an exploded, cutaway view of portions of the rotor assembly 60. FIG. 5B illustrates a side view of one of the airfoils 66 secured to the hub 62. The rotor assembly 60 includes a plurality of retention pins 68 for securing the airfoils 66 to the hub 62 (see FIG. 2). Each of the platforms 70 can abut the adjacent airfoils 66 at a position radially outward of the retention pins 68, as illustrated by FIG. 2.

Each of the retention pins 68 is dimensioned to extend through the root section 66B of a respective one of the airfoils 66 and to extend through each of the flanges 62B to mechanically attach the root section 66B of the respective airfoil 66 to the hub 62, as illustrated by FIGS. 3 and 5B. The retention pins 68 react to centrifugal loads in response to rotation of the airfoils 66. The hub 62 can include at least three annular flanges 62B, such five flanges 62B as shown, and are axially spaced apart relative to the longitudinal axis X to support a length of each of the retention pins 68. However, fewer or more than five flanges 62B can be utilized with the teachings herein. Utilizing three or more flanges 62B can provide relatively greater surface contact area and support along a length each retention pin 68, which can reduce bending and improve durability of the retention pin 68.

Figure 6:
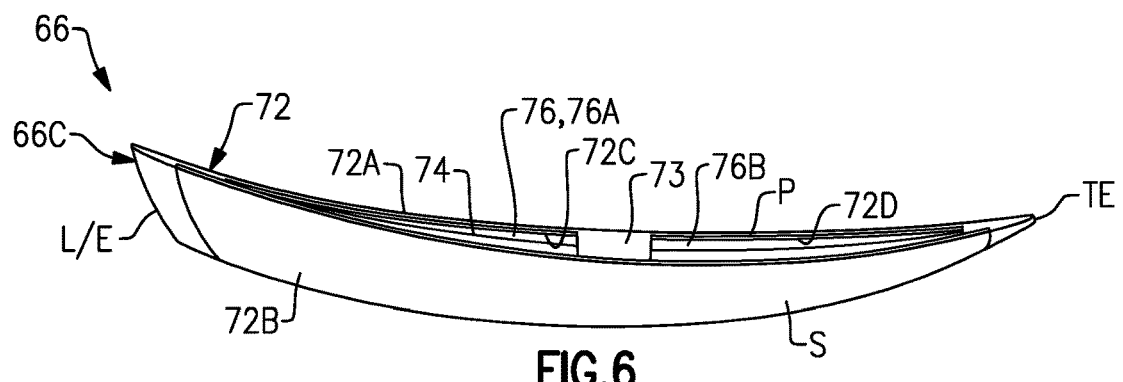
FIG. 6 illustrates an end view of an airfoil section of one of the airfoils of FIG. 2.
Figure 7:
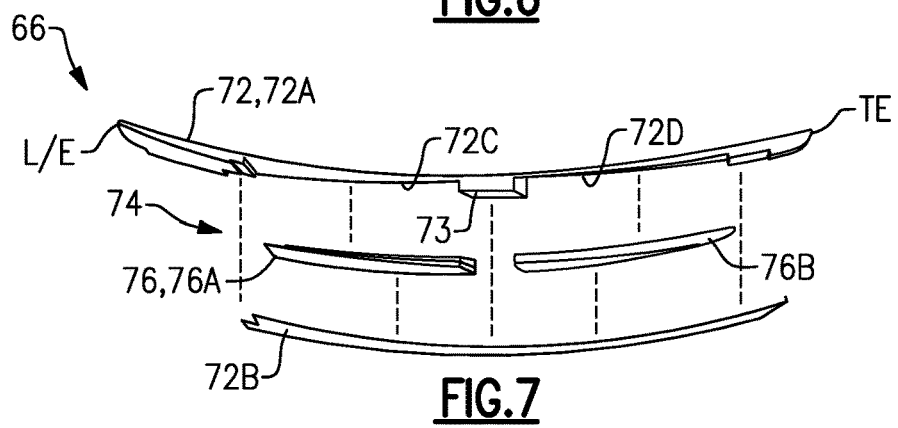
FIG. 7 illustrates an exploded view of the airfoil section of FIG. 6.
Figure 8:
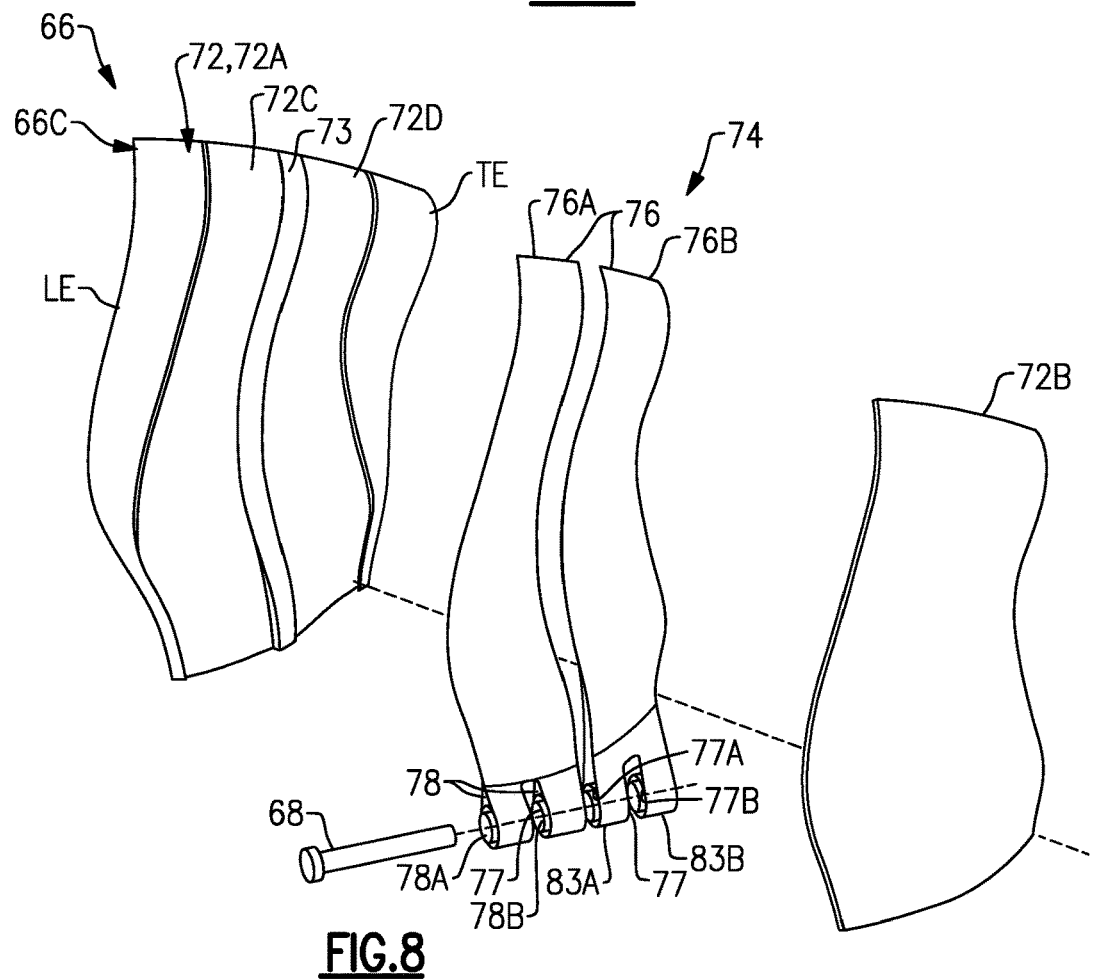
FIG. 8 illustrates an exploded perspective view of an airfoil including the airfoil section of FIG. 6.

The airfoil 66 can be a hybrid airfoil including metallic and composite portions. Referring to FIGS. 6-8, with continuing reference to FIGS. 5A-5B, the airfoil 66 includes a metallic sheath 72 that at least partially receives and protects a composite core 74. In some examples, substantially all of the aerodynamic surfaces of the airfoil 66 are defined by the sheath 72. The sheath 72 can be dimensioned to terminate radially inward prior to the root section 66B such that the sheath 72 is spaced apart from the respective retention pin(s) 68, as illustrated by FIG. 5B. The sheath 72 includes a first skin 72A and a second skin 72B. The first and second skins 72A, 72B are joined together to define an external surface contour of the airfoil 66 including the pressure and suction sides P, S of the airfoil section 66A.

The core 74 includes one or more ligaments 76 that define portions of the airfoil and root sections 66A, 66B. The ligament 76 can define radially outermost extent or tip of the tip portion 66C, as illustrated by FIG. 6. In other examples, the ligaments 76 terminate prior to the tip of the airfoil section 66A. In the illustrative example of FIGS. 6-8, the core 74 includes two separate and distinct ligaments 76A, 76B spaced apart from each other as illustrated in FIGS. 5B and 6. The core 74 can include fewer or more than two ligaments 76, such as three to ten ligaments 76. The ligaments 76A, 76B extend outwardly from the root section 66B towards the tip portion 66C of the airfoil section 66A, as illustrated by FIGS. 3, 6 and 8.

The sheath 72 defines one or more internal channels 72C, 72C to receive the core 74. In the illustrated example of FIGS. 6-8, the sheath 72 includes at least one rib 73 defined by the first skin 72A that extends in the radial direction R to bound the adjacent channels 72C, 72D. The ligaments 76A, 76B are received in respective internal channels 72C, 72D such that the skins 72A, 72B at least partially surround the core 74 and sandwich the ligaments 76A, 76B therebetween, as illustrated by FIG. 6. The ligaments 76A, 76B receive the common retention pin 68 such that the common retention pin 68 is slideably received through at least three, or each, of annular flanges 62B. The common retention pin 68 is dimensioned to extend through each and every one of the interface portions 78 of the respective airfoil 66 to mechanically attach or otherwise secure the airfoil 66 to the hub 62.

Referring to FIGS. 9-10, with continued reference to FIGS. 5A-5B and 6-8, each of one of the ligaments 76 includes at least one interface portion 78 in the root section 66B. FIG. 9 illustrates ligament 76 with the first and second skin 72A, 72B removed. FIG. 10 illustrates the core 74 and skins 72A, 72B in an assembled position, with the interface portion 78 defining portions of the root section 66B. The interface portion 78 includes a wrapping mandrel 79 and a bushing 81 mechanically attached to the mandrel 79 with an adhesive, for example. The bushing 81 is dimensioned to slideably receive one of the retention pins 68 (FIG. 5B). The mandrel 79 tapers from the bushing 81 to define a teardrop profile, as illustrated by FIG. 11.

In the illustrative example of FIGS. 5B and 8, each of the ligaments 76 defines at least one slot 77 in the root section 66B to define first and second root portions 83A, 83B received in the annular channels 62D on opposed sides of the respective flange 62B such that the root portions 83A, 83B are interdigitated with the flanges 62B. The slots 77 can decrease bending of the retention pins 68 by decreasing a distance between adjacent flanges 62B and increase contact area and support along a length of the retention pin 68, which can reduce contact stresses and wear.

Each ligament 76 can include a plurality of interface portions 78 (indicated as 78A, 78B) received in root portions 83A, 83B, respectively. The interface portions 78A, 78B of each ligament 76A, 76B receive a common retention pin 68 to mechanically attach or otherwise secure the ligaments 76A, 76B to the hub 62. The root section 66B defines at least one bore 85 as dimension receive a retention pin 68. In the illustrated example of FIG. 5B, each bore 85 is defined by a respective bushing 81.

Various materials can be utilized for the sheath 72 and composite core 74. In some examples, the first and second skins 72A, 72B comprise a metallic material such as titanium, stainless steel, nickel, a relatively ductile material such as aluminum, or another metal or metal alloy, and the core 74 comprises carbon or carbon fibers, such as a ceramic matrix composite (CMC). In examples, the sheath 72 defines a first weight, the composite core 74 defines a second weight, and a ratio of the first weight to the second weight is at least 1:1 such that at least 50% of the weight of the airfoil 66 is made of a metallic material. The metal or metal alloy can provide relatively greater strength and durability under operating conditions of the engine and can provide relatively greater impact resistance to reduce damage from foreign object debris (FOD). The composite material can be relatively strong and lightweight, but may not be as ductile as metallic materials, for example. The hybrid construction of airfoils 66 can reduce an overall weight of the rotor assembly 60.

In the illustrative example of FIGS. 9 and 10, each of the ligaments 76 includes at least one composite layer 80. Each composite layer 80 can be fabricated to loop around the interface portion 78 and retention pin 68 (when in an installed position) such that opposed end portions 80A, 80B of the respective layer 80 are joined together along the airfoil portion 66A. The composite layers 80 can be dimensioned to define a substantially solid core 74, such that substantially all of a volume of the internal cavities 72C, 72D of the sheath 72 are occupied by a composite material comprising carbon. In the illustrated example of FIGS. 9 and 10, the composite layers 80 include a first composite layer 80C and a second composite layer 80D between the first layer 80C and an outer periphery of the interface portion 78. The composite layers 80C and 80D can be fabricated to each loop around the interface portion 78 and the retention pin 68.

The layers 80 can include various fiber constructions to define the core 74. For example, the first layer 80C can define a first fiber construction, and the second layer 80D can define a second fiber construction that differs from the first fiber construction. The first fiber construction can include one or more uni-tape plies or a fabric, and the second fiber construction can include at least one ply of a three-dimensional weave of fibers as illustrated by layer 80-1 of FIG. 14A, for example. It should be appreciated that uni-tape plies include a plurality of fibers oriented in the same direction ("uni-directional"), and fabric includes woven or interlaced fibers, each known in the art. In examples, each of the first and second fiber constructions includes a plurality of carbon fibers. However, other materials can be utilized for each of the fiber constructions, including fiberglass, Kevlar®, a ceramic such as Nextel™, a polyethylene such as Spectra®, and/or a combination of fibers.

Figure 14B:
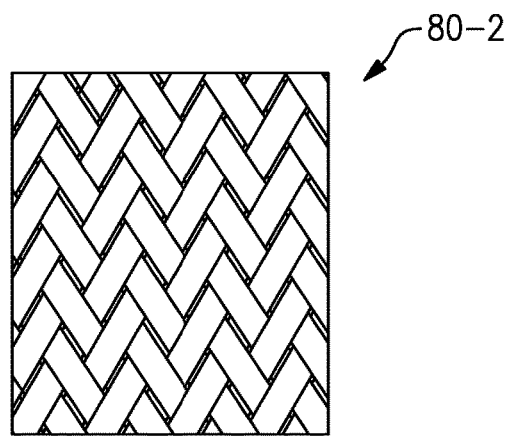
FIG. 14B illustrates a plurality of braided yarns for a composite layer.
Figures 14A, 14C, 14D, 14E:
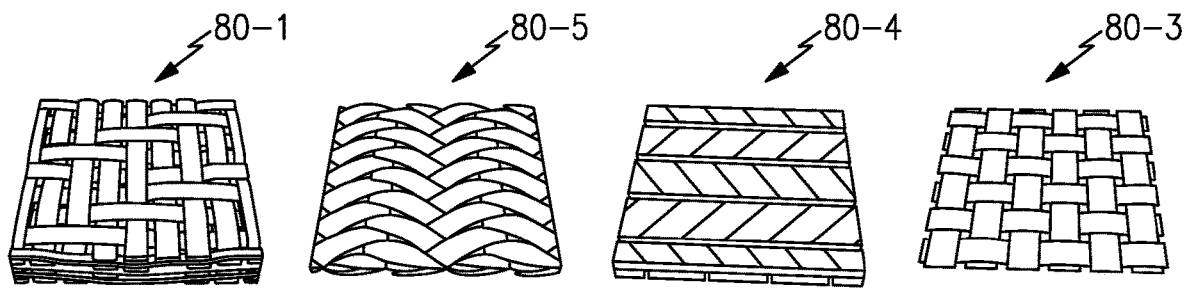
FIG. 14A illustrates a three-dimensional woven fabric for a composite layer.
FIG. 14C illustrates a two-dimensional woven fabric for a composite layer.
FIG. 14D illustrates a non-crimp fabric for a composite layer.
FIG. 14E illustrates a tri-axial braided fabric for a composite layer.

Other fiber constructions can be utilized to construct each of the layers 80, including any of the layers 80-2 to 80-5 of FIGS. 14B-14E. FIG. 14B illustrates a layer 80-2 defined by a plurality of braided yarns. FIG. 14C illustrates a layer 80-3 defined by a two-dimensional woven fabric. FIG. 14D illustrates a layer 80-4 defined by a non-crimp fabric. FIG. 14E illustrates a layer 80-5 defined by a tri-axial braided fabric. Other example fiber constructions include biaxial braids and plain or satin weaves.

The rotor assembly 60 can be constructed and assembled as follows. The ligaments 76A, 76B of core 74 are situated in the respective internal channels 72C, 72D defined by the sheath 72 such that the ligaments 76A, 76B are spaced apart along the root section 66B by one of the annular flanges 62B and abut against opposed sides of rib 73, as illustrated by FIGS. 5B, 6 and 13.

In some examples, the ligaments 76A, 76B are directly bonded or otherwise mechanically attached to the surfaces of the internal channels 72C, 72D. Example bonding materials can include polymeric adhesives such as epoxies, resins such as polyurethane and other adhesives curable at room temperature or elevated temperatures. The polymeric adhesives can be relatively flexible such that ligaments 76 are moveable relative to surfaces of the internal channels 72C, 72D to provide damping during engine operation. In the illustrated example of FIGS. 9-10 and 12-13, the core 74 includes a plurality of stand-offs or detents 82 that are distributed along surfaces of the ligaments 76. The detents 82 are dimensioned and arranged to space apart the ligaments 76 from adjacent surfaces of the internal channels 72C, 72D. Example geometries of the detents 82 can include conical, hemispherical, pyramidal and complex geometries. The detents 82 can be uniformly or non-uniformly distributed. The detents 82 can be formed from a fiberglass fabric or scrim having raised protrusions made of rubber or resin that can be fully cured or co-cured with the ligaments 76, for example.

The second skin 72B is placed against the first skin 72A to define an external surface contour of the airfoil 66, as illustrated by FIGS. 6 and 13. The skins 72A, 72B can be welded, brazed, riveted or otherwise mechanically attached to each other, and form a "closed loop" around the ligaments 76.

The detents 82 can define relatively large bondline gaps between the ligaments 76 and the surfaces of the internal channels 72C, 72D, and a relatively flexible, weaker adhesive can be utilized to attach the sheath 72 to the ligaments 76. The relatively large bondline gaps established by the detents 82 can improve flow of resin or adhesive such as polyurethane and reducing formation of dry areas. In examples, the detents 82 are dimensioned to establish bondline gap of at least a 0.020 inches, or more narrowly between 0.020 and 0.120 inches. The relatively large bondline gap can accommodate manufacturing tolerances between the sheath 72 and core 74, can ensure proper positioning during final cure and can ensure proper bond thickness. The relatively large bondline gap allows the metal and composite materials to thermally expand, which can reduce a likelihood of generating discontinuity stresses. The gaps and detents 82 can also protect the composite from thermal degradation during welding or brazing of the skins 72A, 72B to each other.

For example, a resin or adhesive such as polyurethane can be injected into gaps or spaces established by the detents 82 between the ligaments 76 and the surfaces of the internal channels 72C, 72D. In some examples, a relatively weak and/or soft adhesive such as polyurethane is injected into the spaces. Utilization of relatively soft adhesives such as polyurethane can isolate and segregate the disparate thermal expansion between metallic sheath 72 and composite core 74, provide structural damping, isolate the delicate inner fibers of the composite core 74 from relatively extreme welding temperatures during attachment of the second skin 72B to the first skin 72A, and enables the ductile sheath 72 to yield during a bird strike or other FOD event, which can reduce a likelihood of degradation of the relatively brittle inner fibers of the composite core 74.

The composite layers 80 can be simultaneously cured and bonded to each other with the injected resin, which may be referred to as "co-bonding" or "co-curing". In other examples, the composite layers 80 can be pre-formed or pre-impregnated with resin prior to placement in the internal channels 72C, 72D. The composite core 74 is cured in an oven, autoclave or by other conventional methods, with the ligaments 76 bonded to the sheath 72, as illustrated by FIGS. 10 and 13.

The airfoils 66 are moved in a direction D1 (FIGS. 5A-5B) toward the outer periphery 62C of the hub 62. A respective retention pin 68 is slideably received through each bushing 81 of the interface portions 78 and each of the flanges 62B to mechanically attach the ligaments 76 to the flanges 62B. The platforms 70 are then moved into abutment against respective pairs of airfoils 66 at a position radially outward of the flanges 62B to limit circumferential movement of the airfoil sections 66A, as illustrated by FIG. 2.

Mechanically attaching the airfoils 66 with retention pins 68 can allow the airfoil 66 to flex and twist, which can reduce a likelihood of damage caused by FOD impacts by allowing the airfoil 66 to bend away from the impacts. The rotor assembly 60 also enables relatively thinner airfoils which can improve aerodynamic efficiency.

Figure 15:
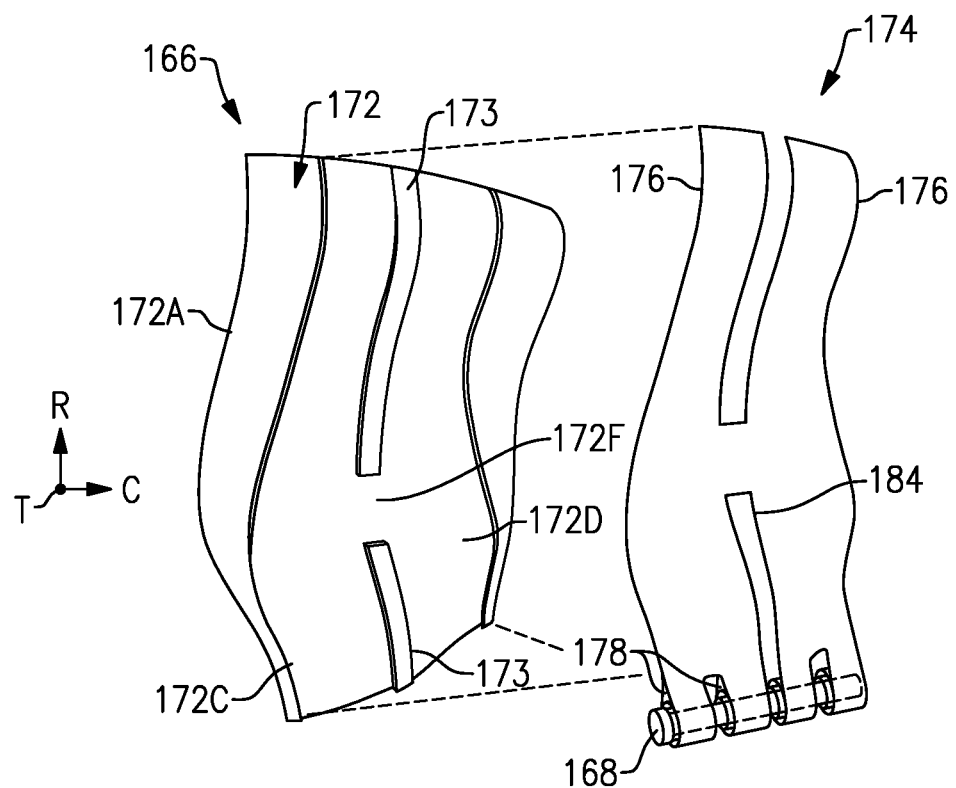
FIG. 15 illustrates an exploded view of an airfoil including a sheath and core according to another example.
Figure 16:
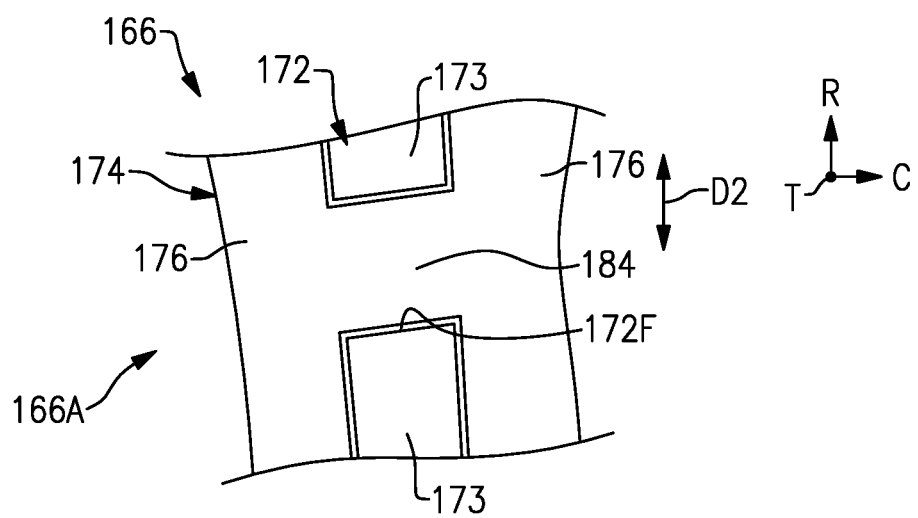
FIG. 16 illustrates the core situated in the sheath of FIG. 15.

FIGS. 15-16 illustrate an airfoil 166 according to another example. In this disclosure, like reference numerals designate like elements where appropriate and reference numerals with the addition of one-hundred or multiples thereof designate modified elements that are understood to incorporate the same features and benefits of the corresponding original elements. A first skin 172A of sheath 172 defines internal channels 172C, 172D. The internal channels 172C, 172D are adjacent to each other and are bounded by a pair of opposing ribs 173. The ribs 173 can extend in a radial direction R, for example, and are spaced apart along an internal gap 172F that interconnects the internal cavities 172C, 172D. The internal gap 172F can be spaced apart from the radial innermost and outermost ends of the first skin 172A of the sheath 172. Composite core 174 includes a ligament bridge 184 that interconnects an adjacent pair of ligaments 176 at a location radially outward of a common pin 168 (shown in dashed lines in FIG. 15 for illustrative purposes). The ligament bridge 184 can be made of any of the materials disclosed herein, such as a composite material.

The ligament bridge 184 is dimensioned to be received within the gap 172F. The ligament bridge 184 interconnects the adjacent pair of ligaments 176 in a position along the airfoil section 166A when in the installed position. During operation, the core 174 may move in a direction D2 (FIG. 16) relative to the sheath 172, which can correspond to the radial direction R, for example. The ligament bridge 184 is dimensioned to abut against the opposing ribs 173 of the sheath 172 in response to movement in direction D2 to react blade pull and bound radial movement of the core 174 relative to the sheath 172. The ligament bridge 184 serves as a fail-safe by trapping the ligaments 176 to reduce a likelihood of liberation of the ligaments 176 which may otherwise occur due to failure of the bond between the sheath 172 and ligaments 176.

Figure 17:
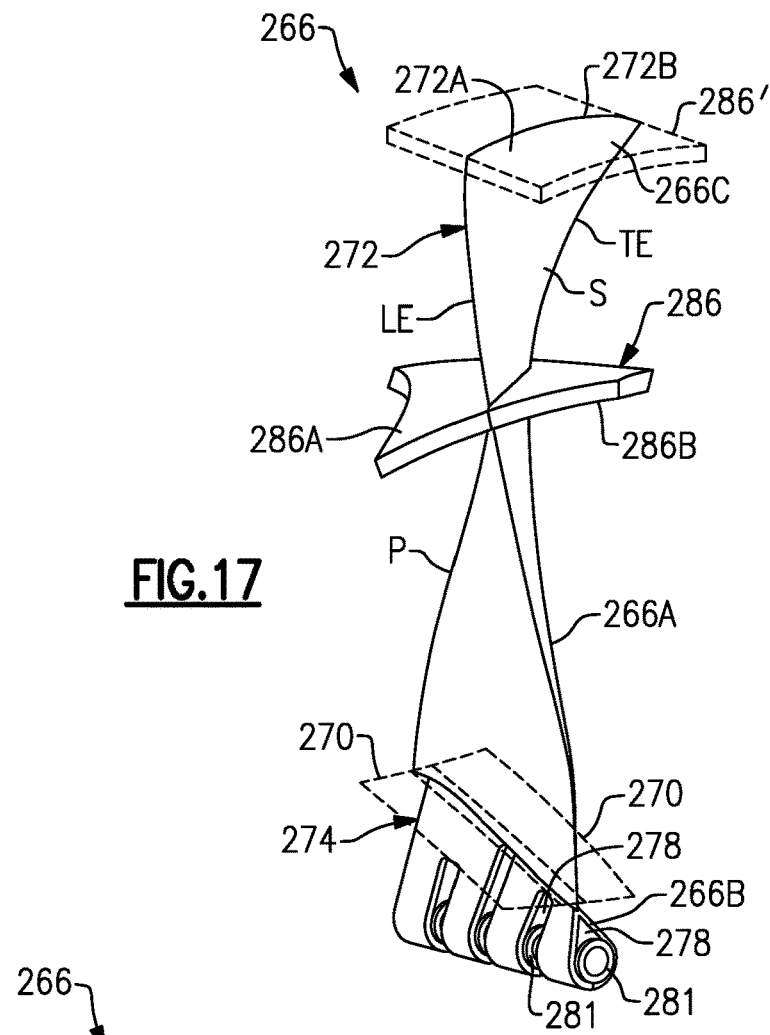
FIG. 17 illustrates an airfoil including a shroud according to yet another example.
Figure 18:
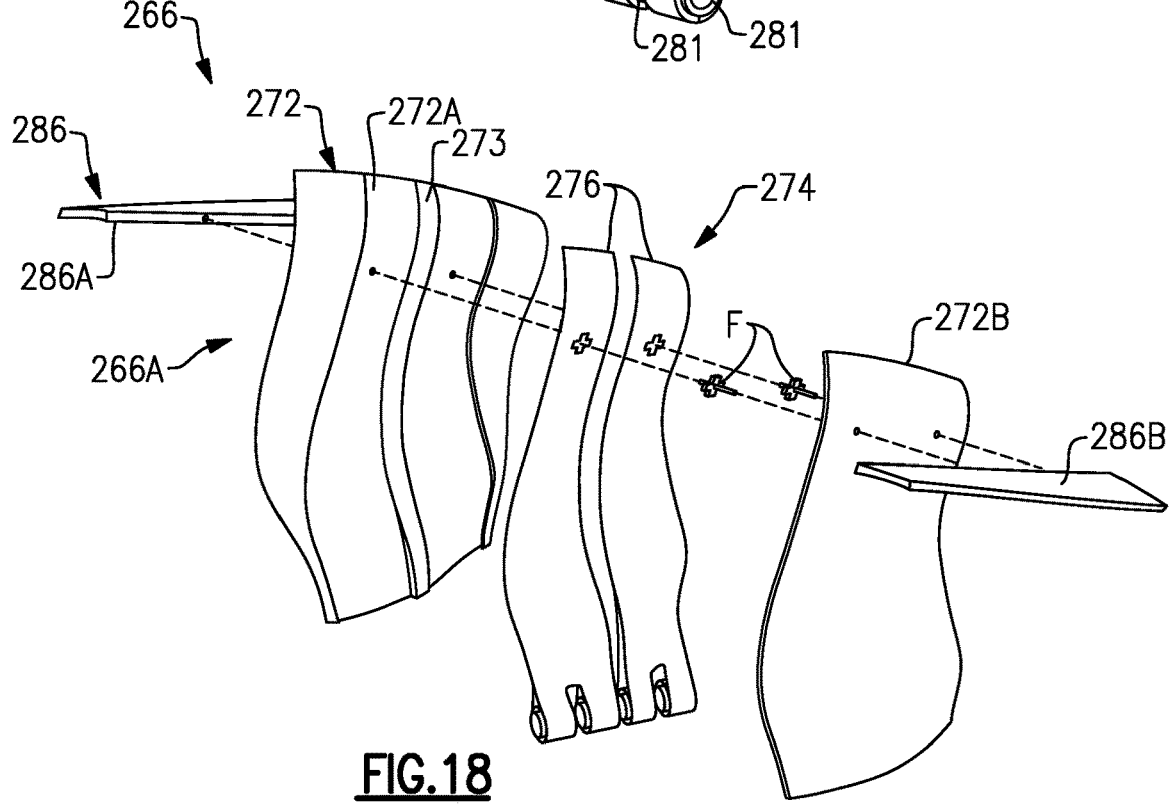
FIG. 18 illustrates an exploded view of the airfoil of FIG. 17.

FIGS. 17 and 18 illustrate an airfoil 266 according to yet another example. Airfoil 266 includes at least one shroud 286 that extends outwardly from pressure and suction sides P, S of airfoil section 266A at a position radially outward of platforms 270 (shown in dashed lines in FIG. 17 for illustrative purposes). The shroud 286 defines an external surface contour and can be utilized to tune mode(s) of the airfoil 266 by changing boundary constraints. The shroud 286 can be made of a composite or metallic material, including any of the materials disclosed herein, or can be made of an injection molded plastic having a plastic core and a thin metallic coating, for example. The airfoil 266 can include a second shroud 286' (shown in dashed lines) to provide a dual shroud architecture, with shroud 286 arranged to divide airfoil between bypass and core flow paths B, C (FIG. 1) and shroud 286' for reducing a flutter condition of the airfoil 266, for example.

The shroud 286 includes first and second shroud portions 286A, 286B secured to the opposing pressure and suction sides P, S. The shroud portions 286A, 286B can be joined together with one or more inserts fasteners F that extend through the airfoil section 266A. The fasteners F can be baked into the ligaments 276, for example, and can be frangible to release in response to a load on either of the shroud portions 286A, 286B exceeding a predefined threshold. It should be appreciated that other techniques can be utilized to mechanically attach or otherwise secure the shroud portions 286A, 286B to the airfoil 266, such as by an adhesive, welding or integrally forming the skins 272A, 272B with the respective shroud portions 286A, 286B. In some examples, the airfoil 266 includes only one of the shroud portions 286A, 286B such that the shroud 286 is on only one side of the airfoil section 266A or is otherwise unsymmetrical.

Figure 19:
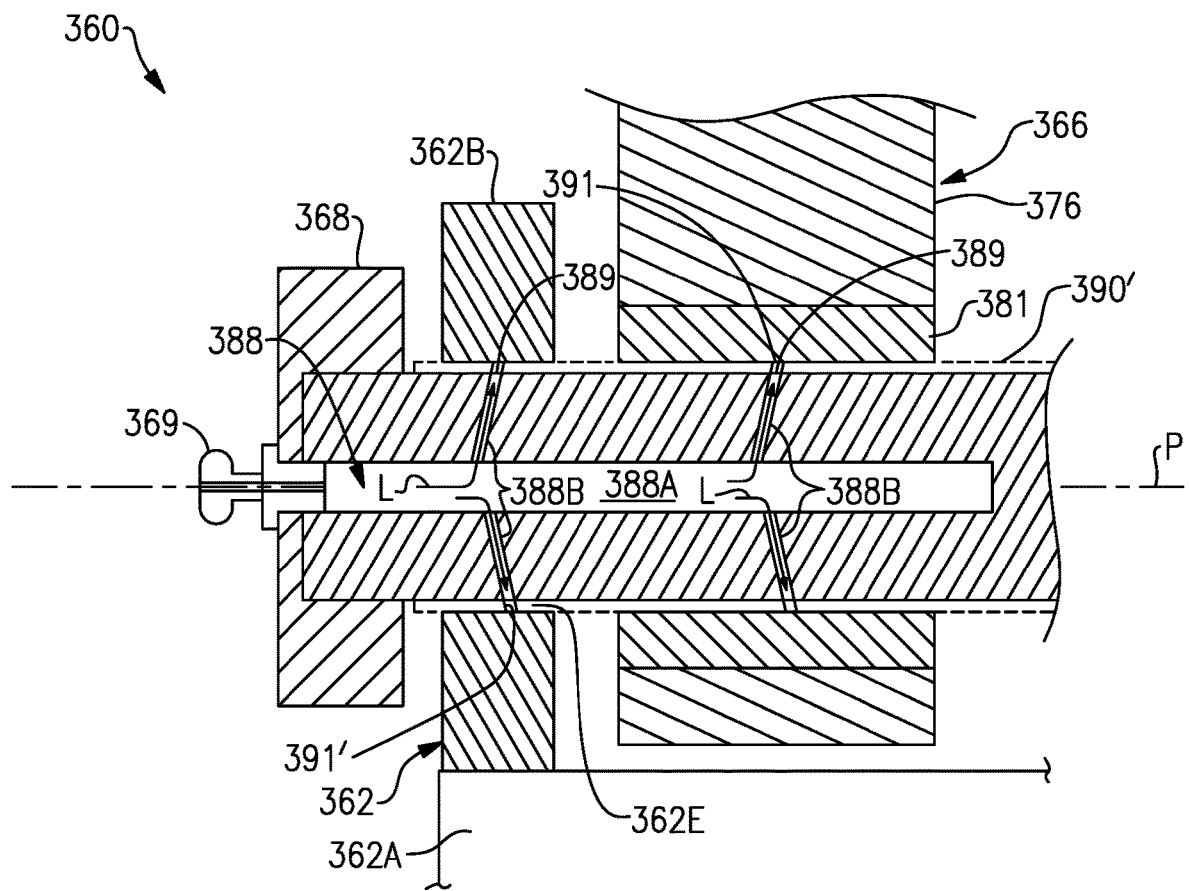
FIG. 19 illustrates a retention pin including an internal lubricant circuit.

FIG. 19 illustrates a rotor assembly 360 for a gas turbine engine according to another example. Retention pin 368 defines an internal lubrication network or circuit 388 dimensioned to receive a quantity of lubricant L for lubricating surfaces of the retention pin 368 adjacent to surfaces of annular flanges 362B and bushings 381 (one flange 362B and bushing 381 shown for illustrative purposes). Example lubricants can include grease or grease carrying anti-gall solid lubricants, for example.

The internal lubrication circuit 388 defines a primary (or first) path 388A and one or more branch (or second) paths 388B in a thickness of the retention pin 368. The primary path 388A extends along a pin axis P between ends of the retention pin 368. An inlet can be established by a grease fitting 369 or another suitable structure that is received in an end of the retention pin 368 for injecting lubricant L into the primary path 388A.

Each of the branched paths 388B extends outwardly from the primary path 388A to a respective aperture or outlet 389 along an outer periphery of the retention pin 368. Each of the outlets 389 is axially aligned with a respective flange 362B or bushing 381 with respect to the pin axis P such that lubricant L is ejected from the outlets 388B to lubricate adjacent surfaces of the flanges 362B, retention pin 368 and bushings 381. The lubrication circuit 388 delivers lubricant L to contact surfaces to reduce wear that may be otherwise caused by relative movement of the components during engine operation.

Figure 20:
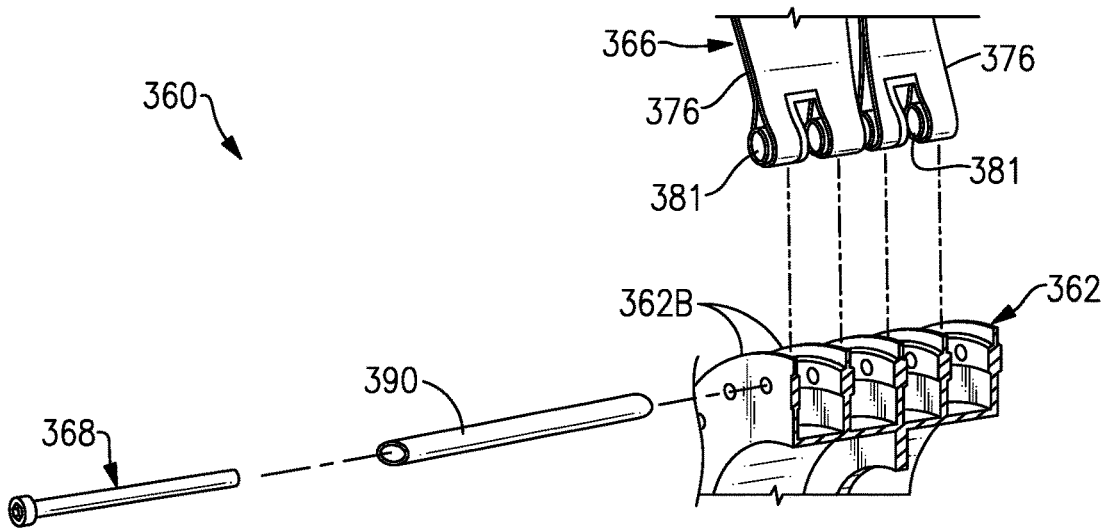
FIG. 20 illustrates an exploded view of a rotor assembly including a sleeve for a retention pin.

Referring to FIG. 20, with continued reference to FIG. 19, the rotor assembly 360 can include an elongated sleeve 390 (indicated at 390' in dashed lines in FIG. 19 for illustrative purposes) that is dimensioned to be slideably received along, and carried by, a length of the retention pin 368 such that the retention pin 368 is spaced apart from surfaces of the bushings 381 and surfaces of each bore 362E (FIG. 19) defined by the flange 362B to receive the retention pin 368. Sleeve 390' can define apertures 391' that align with outlets 389. In the illustrative example of FIG. 20, the sleeve 390 is substantially free of any apertures between ends of the sleeve 390 and the lubrication circuit 388 can be omitted.

The elongated sleeve 390 can have a relatively thin construction and is dimensioned to space apart the components along a length of the retention pin 368 to reduce direct contact along adjacent surfaces of the retention pin 368, flanges 362B, and bushings 381, which can reduce wear and improve cathodic protection of the components. The hub 362 and bushings 381 can be made of a metal or metal alloy, such as titanium, for example.

Figure 20A:
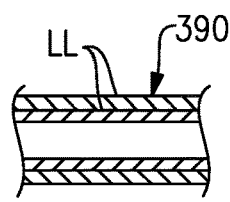
FIG. 20A illustrates a sectional view of the retention sleeve of FIG. 20.

In examples, the sleeve 390 is made of an abradable material to absorb the frictional forces, and can be a disposable item that is replaced during a maintenance operation once wear exceeds a predetermined limit. Example materials can include one or more layers LL (FIG. 20A) of metal or metal alloys, such as titanium or an amalgam with a lubricity and that yields to redistribute hertz contact stresses that may be experienced along a length of the retention pin 368 due to centrifugal forces, vibration and FOD impacts during operation, for example, which can improve durability of the adjacent components.

Figure 23:
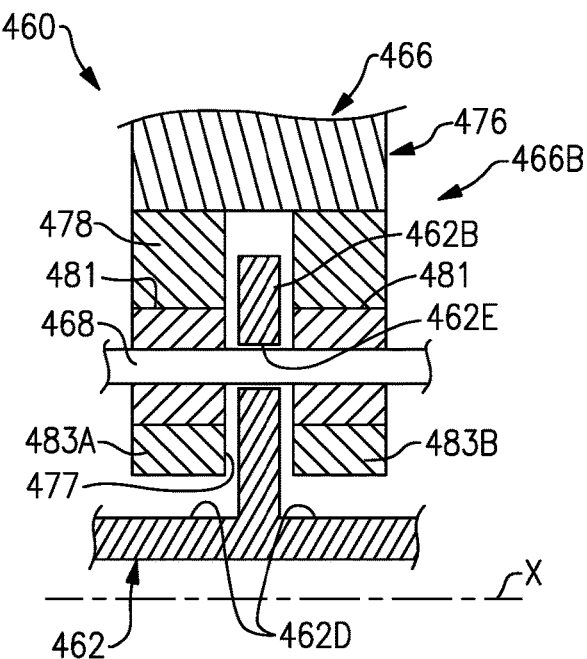
FIG. 23 illustrates a sectional view of the airfoil of FIG. 22.

FIGS. 21-24 illustrate a rotor assembly 460 according to yet another example. Each ligament 476 defines a circumferential slot 477 in root section 466B to define first and second root portions 483A, 483B. Each slot 477 can be dimensioned to terminate prior to the airfoil section 466B. The root portions 483A, 483B are dimensioned to be received in adjacent channels 462D on opposed sides of one of the annular flanges 462B of hub 462. In the illustrative example of FIG. 24, the hub 462 includes more than two flanges 462B, with each set of root portions 483A, 483B straddles a respective one of the flanges 462B. Each of the root portions 483A, 483B includes a respective interface portion 478, as illustrated by FIG. 23.

Figure 24:
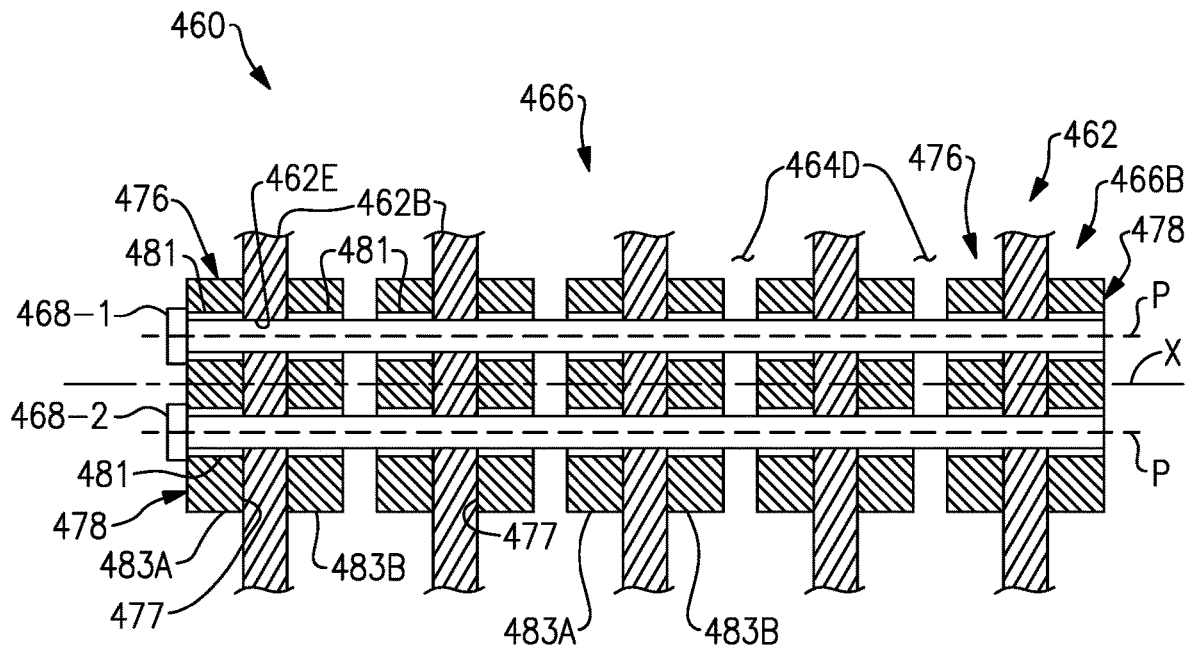
FIG. 24 illustrates a sectional view of the rotor assembly of FIG. 22.
Figure 27:
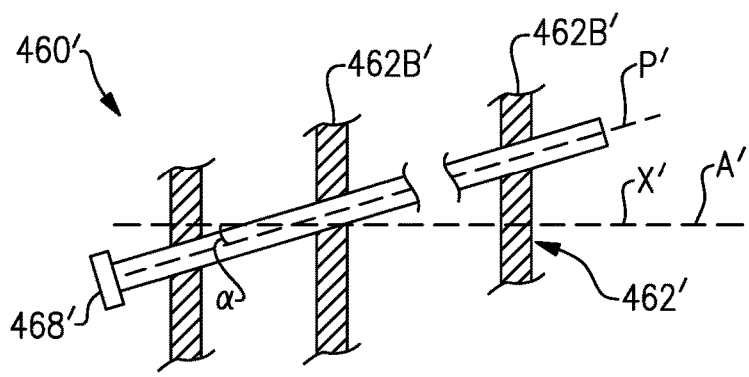
FIG. 27 illustrates a rotor assembly according to an example.

The rotor assembly 460 includes a plurality of retention pins 468 arranged in sets to secure each respective airfoil 466 to the hub 462. The rotor assembly 460 includes at least twice as many retention pins 468 as airfoils 466. In other examples, three or more retention pins 468 are utilized to secure each airfoil 466 to the hub 462. Securing each airfoil 466 with two or more retention pins 468 utilizing the techniques disclosed herein can increase a lateral bending stiffness of the airfoil 466, which can improve flutter margins and reduce bending caused by FOD impacts. Each retention pin 468 defines a respective pin axis P, which can be substantially parallel to a longitudinal axis X of the hub 462 as illustrated by FIG. 24 and the engine longitudinal axis A (FIG. 1). In other examples, the retention pins are skewed relative to the longitudinal axis of the hub and the engine longitudinal axis A (FIG. 1), as illustrated by pin axis P', axis X' and axis A' in FIG. 27. In the illustrated example of FIG. 27, a radial projection of the pin axis P' defines a reference plane that is transverse to axis X' and axis A' to define an angle α. Angle α is non-zero and can be between 5 and 45 degrees, for example.

Bores of the bushings 481 and bores 462E of the flanges 462B can be substantially aligned in two rows when in an installed position, as illustrated in FIG. 24. Each of the retention pins 468-1, 468-2 can be dimensioned to extend through the root portions 483A, 483B of each ligament 476 in the root section 466B of the respective airfoil 466, across each of the annular channels 462D, and through each of the annular flanges 462B to mechanically attach the root section 466B to the hub 466, as illustrated by FIG. 24. The respective interface portions 478 in each of the root portions 483A, 483B receives one of the retention pins 468-1, 468-2 such that the retention pins 468-1, 468-2 extend through each slot 477 defined in the root section 466B. Each of the retention pins 468 can define an internal lubrication circuit as illustrated by internal lubrication circuit 388 of FIG. 19.

The first and second retention pins 468-1, 468-2 can be at least partially axially aligned with respect to longitudinal axis X when in an installed position, as illustrated by FIGS. 23 and 24. The root section 466B includes a plurality of bushings 481 that receive each of the retention pins 468-1, 468-2 along each of the root portions 483A, 483B, with each of the flanges 462B defining bores 462E for receiving the retentions pin 468-1, 468-2, as illustrated by FIG. 24.

Figure 25:
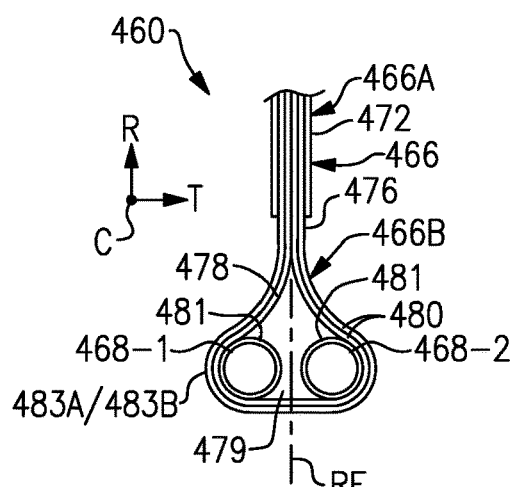
FIG. 25 illustrates a rotor assembly according to another example.

Each of the first and second retention pins 468-1, 468-2 can be identical or symmetrical, can be substantially identical in construction excluding differences due to manufacturing variations and imperfections. The retention pins 468-1, 468-2 can be made of the same type of material and can have the same physical dimensions including the same cross-sectional geometry along a length of the retention pins 468-1, 468-2. In the illustrative example of FIG. 25, each of the retention pins 468-1, 468-2 has a circular or otherwise elliptical cross-sectional geometry. However, other cross-sectional geometries such as rectangular and complex geometries can be utilized.

Each interface portion 478 can include a wrapping mandrel 479 tapering from first and second bushings 481 that slideably receive respective ones of the retention pins 468-1, 468-2. One or more composite layers 480 can be fabricated to each loop around the interface portion 478 and the retention pins 468-1, 468-2. The composite layers 480 can include any of the composite layers and fiber constructions disclosed herein.

The retention pins 468-1, 468-2 can be arranged in the root section 466B at various locations to secure the airfoil 466 to the hub 462. Each ligament 476 defines a reference plane RF that extends in the radial and chordwise directions R, C through the airfoil section 466A to circumferentially divide each of the root portions 483A/483B. A pair of bushings 481 can be positioned in the root portion 483A/483B such that the retention pins 468-1, 468-2 are on opposite sides of the reference plane RF and are offset in a circumferential direction or thickness direction T from the reference plane RF when in an installed position.

Figure 26:
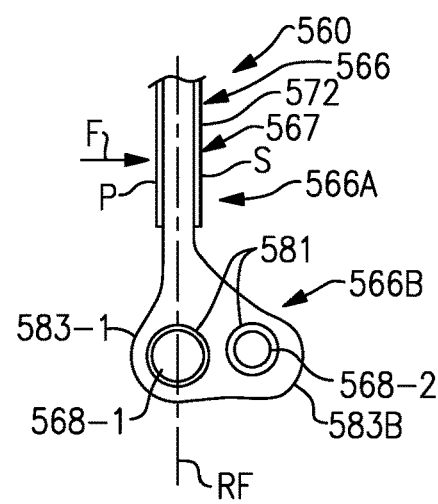
FIG. 26 illustrates a rotor assembly according to yet another example.
Figure 21:
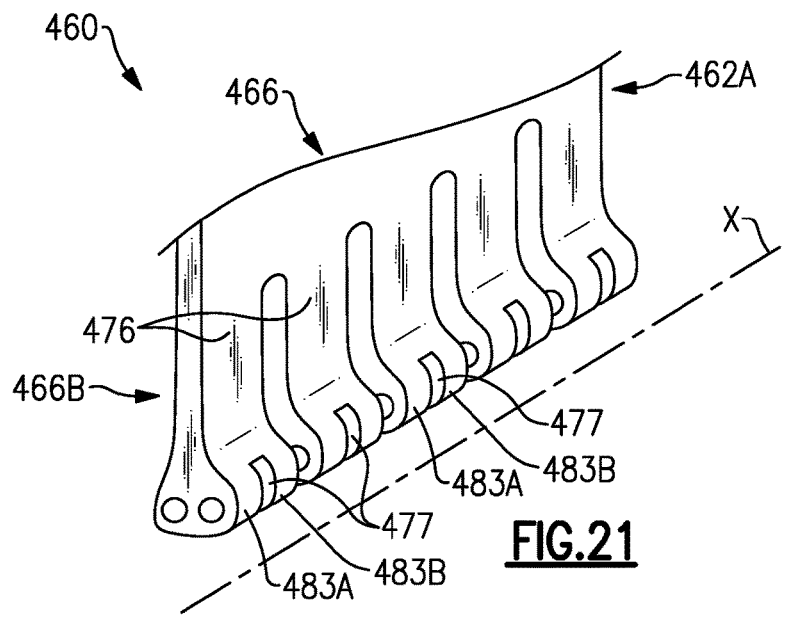
FIG. 21 illustrates a perspective view of an airfoil according to another example.
Figure 22:
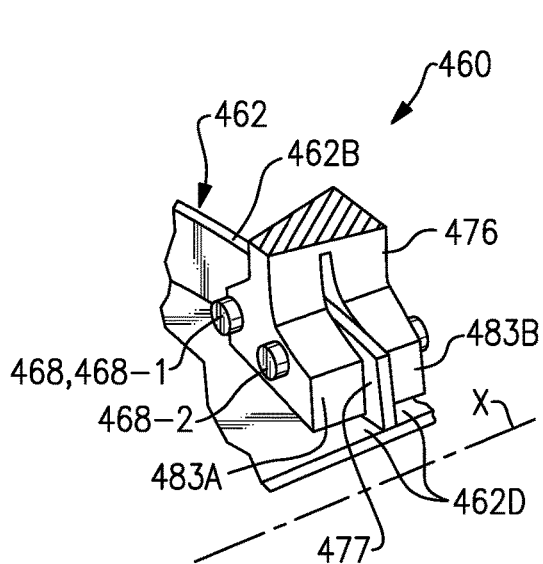
FIG. 22 illustrates a perspective view of the airfoil of FIG. 21 mounted to a hub.

Referring to FIG. 26, an airfoil 566 according to another example is shown. First retention pin 568-1 is aligned with reference plane RF, and second retention pin 568-2 is circumferentially offset from the reference plane RF when in the installed position. The first retention pin 568-1 can differ in construction from the second retention pin 568-2. In some examples, the first retention pin 568-1 differs in construction from the second retention pin 568-2 such that yielding of the first retention pin 568-1 occurs prior to yielding of the second retention pin 568-2 in response to a load or force F on the airfoil section 566A that can be communicated to the root section 566B. Example loads or forces can include external loads caused by a bird strike or FOD that impacts the respective airfoil 566 causing the airfoil 566 to sway. Other example loads can include internal loads due to forces caused by rotation of the airfoil 466 during operation.

The retention pins 568-1, 568-2 can be made of different materials to allow the retention pins 568-1, 568-2 to yield at different rates. The first retention pin 568-1 can have a first strength or rigidity and the second retention pin 568-2 can have a second strength or rigidity that differs from the first strength or rigidity. For example, the first retention pin 568-1 can be made of a relatively hard material such as a hardened steel, and the second retention pin 568-2 can be made of a relatively softer material such as a soft aluminum. The relative softer material allows the retention pin 568-2 to bend to allow the airfoil 566 to sway in response to one or more forces experienced by the airfoil 566. Retention pin 568-2 can be adjacent suction side P, and retention pin 568-1 can be adjacent to pressure side P, for example, such that airfoil 466 can sway circumferentially during engine operation.

In the illustrated example of FIG. 26, the retention pins 568-1, 568-2 are asymmetrical, with retention pin 568-1 having a cross-sectional geometry along a length of the retention pin 568-1 that differs from a cross-sectional geometry of second retention pin 568-2, such as a different cross-sectional area. Securing each airfoil 566 with retention pins 568 utilizing the techniques disclosed herein can improve flutter margins and reduce bending caused by lateral loading from FOD impacts. Retention pin 568-2 can also be fabricated to yield or shear during FOD impacts to improve impact resistance by absorbing at least some of the energy in the retention pin 568-2 rather than along the airfoil section 566.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A rotor assembly for a gas turbine engine comprising:
an airfoil including an airfoil section extending from a root section, wherein the airfoil section extends between a leading edge and a trailing edge in a chordwise direction and extends between a tip portion and the root section in a radial direction, and the airfoil section defines a pressure side and a suction side separated in a thickness direction; and
at least one retention pin that extends through the root section to mechanically attach the root section to an array of annular flanges of a rotatable hub, and the at least one retention pin defines an internal lubrication circuit including branched paths having outlets aligned with the flanges.

2. The rotor assembly as recited in claim 1, wherein the root portion includes a plurality of bushings that receive the at least one retention pin, and the branched paths have outlets aligned with the bushings.

3. The rotor assembly as recited in claim 2, wherein each of the flanges define a bore for receiving the at least one retention pin, and further comprising an elongated sleeve slideably received along a length of the at least one retention pin such that the at least one retention pin is spaced apart from surfaces of the bushings and surfaces of the bore of each of the flanges.

4. A rotor assembly as recited in claim 1, wherein the at least one retention pin includes first and second retention pins that each extend through the root section and through each of the flanges to mechanically attach the root section to the hub.

5. The rotor assembly as recited in claim 2, wherein the at least one retention pin extends along a pin axis between opposed ends, the internal lubrication circuit includes a primary path that extends along the pin axis, and each of the branched paths extend radially between the primary path and a respective one of the outlets with respect to the pin axis.

6. The rotor assembly as recited in claim 5, wherein the airfoil is a fan blade.

7. A gas turbine engine comprising:
a compressor section including a first compressor and a second compressor;
a turbine section including a first turbine and a fan drive turbine; and
a fan section including a rotor assembly, the rotor assembly comprising:
a rotatable hub coupled to the fan drive turbine via a rotatable shaft, the rotatable hub including an array of annular flanges;
a plurality of fan blades, each of the fan blades including an airfoil section extending from a root section, wherein the airfoil section extends between a leading edge and a trailing edge in a chordwise direction and extends between a tip portion and the root section in a radial direction, and the airfoil section defines a pressure side and a suction side separated in a thickness direction; and
a plurality of retention pins, wherein each of the retention pins extends through the root section of a respective one of the fan blades to mechanically attach the root section to the array of annular flanges of the rotatable hub, and each of the retention pins defines an internal lubrication circuit including branched paths having outlets aligned with the flanges.

8. The gas turbine engine as recited in claim 7, wherein the root portion includes a plurality of bushings that receive a respective one of the pins, and the branched paths have outlets aligned with the respective bushings.

9. The gas turbine engine as recited in claim 8, wherein each of the flanges define a bore for receiving the respective one of the retention pins, and further comprising a plurality of elongated sleeves, each of elongated sleeves slideably received along a length of the respective one of the retention pins such that the respective one of the retention pins is spaced apart from surfaces of the respective bushings and surfaces of the bore of each of the flanges.

* * * * *